July 14, 1964

W. P. LA FORCE 3,140,746

PORTABLE POWER SAW

Filed Feb. 11, 1960

INVENTOR.
Walter P. La Force,
BY

July 14, 1964     W. P. LA FORCE     3,140,746
PORTABLE POWER SAW

Filed Feb. 11, 1960     6 Sheets-Sheet 2

INVENTOR.
Walter P. LaForce,
BY

July 14, 1964 W. P. LA FORCE 3,140,746
PORTABLE POWER SAW

Filed Feb. 11, 1960 6 Sheets-Sheet 3

INVENTOR.
Walter P. La Force,
BY

United States Patent Office 3,140,746
Patented July 14, 1964

3,140,746
PORTABLE POWER SAW
Walter P. La Force, Sheboygan, Wis., assignor to Thomas Industries Inc., Louisville, Ky., a corporation of Delaware
Filed Feb. 11, 1960, Ser. No. 8,164
9 Claims. (Cl. 173—162)

This invention relates to portable power saws, and more particularly to portable power saws in which the saw is reciprocated by an engine, and the engine-saw combination is provided with handle means adapted to be grasped in the hand of the operator for manipulation as desired.

Where the weight of the engine piston and the saw blade operated thereby is opposed by a second piston, there is no substantial problem of transmitting relatively high frequency vibration to the operator through the handle means with sufficient energy to make the saw uncomfortable to operate. Such structures, however, are larger, heavier, less economical and less efficient than a structure wherein the second piston, along with the cylinder, connecting rod and crankshaft throw, can be eliminated.

One of the major problems encountered where the second piston, along with the cylinder, connecting rod and crankshaft throw, are eliminated, resides in a relatively high frequency vibration being transmitted to the operator through the handle means with sufficient force to make the saw uncomfortable to operate. This vibration cannot be reduced to an acceptable level by conventional methods of counterweighting the crankshaft.

Even where the reciprocating weight of the connecting rod, piston and saw blade is reduced to a minimum, it is still far greater than that of the single piston used in a conventional engine.

The broad concept of the present invention resides in isolating the vibration from the handle means, and more particularly in eliminating the second piston along with the cylinder, connecting rod, and crankshaft throw, resulting in a smaller, lighter, more economical and more efficient saw, and isolating the engine and its component parts from the supporting structure with which the handle means is associated, whereby high frequency vibration is not transmitted to the operator with sufficient force to make the saw uncomfortable to operate.

Another feature resides in the provision of properly calibrated springs, rubber mounts, or other resilient material for absorbing some of the energy of the vibrating system and to limits its motion.

Another feature resides in the provision of clearance which will allow the engine and its components to move the desired amount.

Another feature resides in the provision of a throttle control of such character that the movement of the engine and its components does not affect the amount of throttle opening.

Another and more specific feature resides in the provision of a flexible bellows between the carburetor and the engine, with the carburetor attached to a rigid frame, whereby there is no relative motion between the carburetor and the rear handle, thus enabling employment of a direct throttle connection.

Another and more specific feature resides in passing the throttle wire through a hollow flexible casing, which is rigidly attached to the rear handle at one end and to a vibrating carburetor at the other end, with a loop in the casing allowing positive control of the throttle with relative motion between the two.

Another feature resides in including in the isolated system as few components as possible, since it is desirable to keep the ratio of moving weight to total weight as small as possible.

Another and more specific feature resides in including in the moving weight the crankcase, crankshaft, connecting rod, firing cylinder and piston, front housing, saw blade, magneto, flywheel, starter cup, carburetor and air filter.

Another and more specific feature resides in the provision of a supporting structure comprising a main frame to which are attached the handle, or handle means, and the gas tank, shrouding, and starter.

The engine preferably includes a conventional porting system, but the use of ports in the piston extension are shown in alternative forms and within the scope of the present invention.

Further features and numerous advantages and adaptations of the invention will be apparent from the following detailed description taken in connection with the accompanying drawings, it being understood that the invention is limited only within the scope of the appended claims, and not to the particular embodiments selected for illustration.

Referring now to the drawings, the portable power saw illustrated in FIGURES 1 through 6 comprises a cylinder housing 1, which carries a cylinder sleeve 2 and is provided with cooling fins 3 and a spark plug 4.

Mounted for reciprocation in the cylinder sleeve 2 is a piston 5 carrying piston rings 6 and a wrist pin 7. A connecting rod 8 is journaled on the wrist pin 7 and on a crank 9 carried by a crankshaft 10. A flywheel of a conventional flywheel magneto assembly 11 is mounted on the extended portion of the crankshaft 10. The cylinder-piston assembly is fastened to a crankcase 12, or the cylinder 1 may be formed as a unitary part of the crankcase 12, as illustrated, for example, in FIGURES 5 and 6, although this may vary. The crankshaft 10 may be journaled by bearings 13 and 14, at the ends thereof.

It is to be understood that the cylinder-piston assembly is preferably an internal combustion engine of the two-cycle type.

The end of the crankcase 12 opposite the end at which the flywheel is disposed is closed by a closure member 15 fastened to the crankcase 12 by screws or bolts 16. The closure member 15 may carry the bearing 14.

A suitable fuel mixture is introduced into the crankcase 12 from carburetor 17 by way of a suitable one-way valving arrangement, such as a reed valve, or check valve, which permits the fuel mixture to enter the crankcase, but prevents it from flowing out when the piston moves downward or toward the crankcase. The mixture enters through openings 19 in member 18 when the metal reeds 20 bend outward on the forward or outward stroke of the piston. The reeds 20 then seal against the reed valve body 18 when the mitxure is compressed in the crankcase on the back stroke. This is conventional on many two-cycle engines.

As the piston 5 moves toward the crankcase 12 until the piston head 22 opens the ports 23, 25 into the combustion chamber 25, the fuel mixture is forced through ports 26, 27 and ports 23, 24 into the combustion chamber 25. Movement of the piston 5 outwardly or away from the crankcase 12, compresses the fuel mixture in the combustion chamber 25 where it is fired by the spark plug 4. Suitable ignition timing mechanism, such as the conventional flywheel magneto assembly 11, may be provided to time the sequence of operation.

Figure 5:
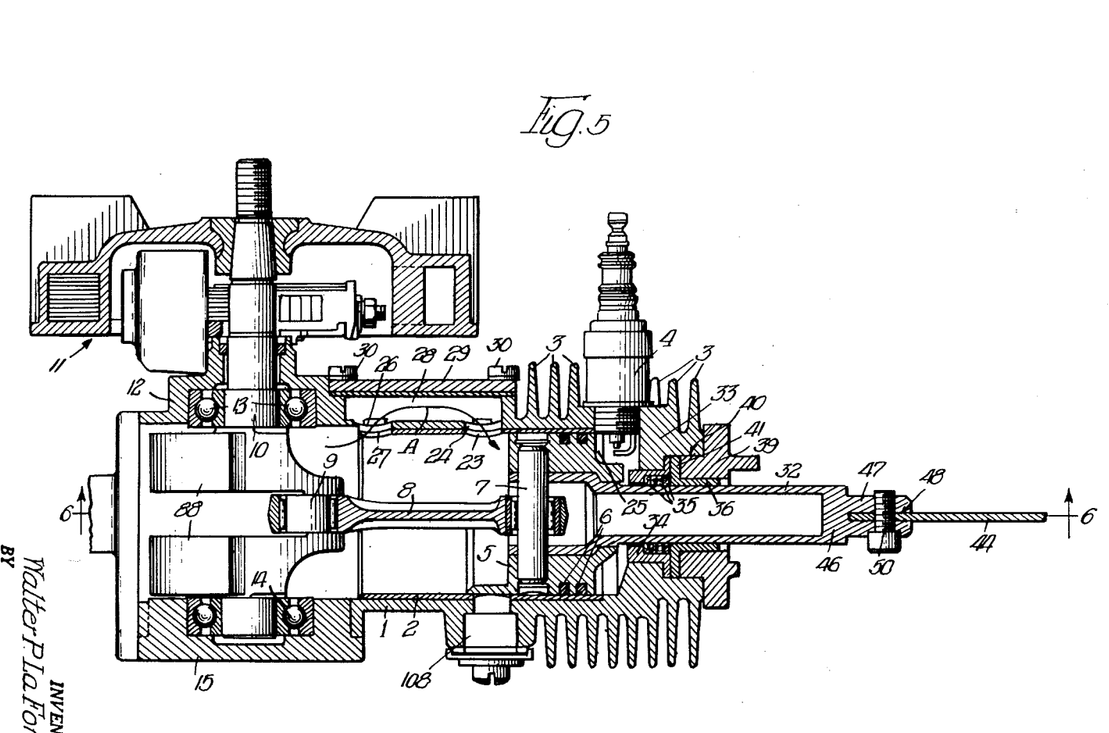
FIGURE 5 is a fragmentary axial sectional view through the cylinder housing and piston and the saw blade and guide combination taken along the line 5—5 of FIGURE 1.

The path of the incoming fuel, when the piston 5 is at the crankcase end of its stroke, is illustrated by the arrow A in FIGURE 5. The fuel passes outwardly through the ports 26 and 27, which open through the cylinder 1 and cylinder sleeve 2, into passage 28 and inwardly through the ports 23 and 24 into the combustion chamber 25 beyond the end of the piston head 22. The ports 24 and 23 also open through the cylinder 1 and cylinder sleeve 2. The connecting passage 28 is closed, for example, by a closure member 29 fastened to the cylinder and crankcase structure by screws or bolts 30.

The head 22 of the piston 5 carries as a unitary part thereof, a piston extension 32 having a tubular wall. The piston extension 32 extends axially outwardly through the combustion chamber 25 and through the cylinder head 33. A flanged sleeve 34 is disposed in the cylinder head 33 about the piston extension 32. Combustion chamber sealing rings 35 are disposed within the sleeve 34 and cooperate with the outer periphery of the piston extension 32 to seal the combustion chamber 25.

Also disposed in the cylinder head 33 about the piston extension 32 in a second flanged sleeve 36. A saw blade guide 38 extends outwardly from the cylinder head 33 (FIGURE 6) and has at its inner end a sleeve portion 39 which fits in the opening 40 in the cylinder head 33 about the flanged sleeve 36 and against the flange 41 thereon. The sleeve portion 39 and the blade guide 38 are positioned with respect to the cylinder head 33, for example, by one or more pins 42 (one being shown).

The upper portion 43 of the reciprocating saw blade 44 is guided in its reciprocating movement in a longitudinally extending slot 45 in the blade guide 38. The outer end of the piston extension 32 is closed at 46 and has a reduced extension 47 provided with longitudinally extending slot 48. The adjacent end of the blade 44 is disposed within the slot 48 and secured in place in the reduced end 47 of the piston extension 32, for example, by a screw or bolt 50. The saw blade 44 is provided with teeth 52 along its lower edge.

The saw blade and guide combination may be of the form disclosed in John W. Wright Patent No. 2,895,514, patented July 21, 1959, or of other form as suitable or desired within the scope of the present invention.

Figures 1, 10:
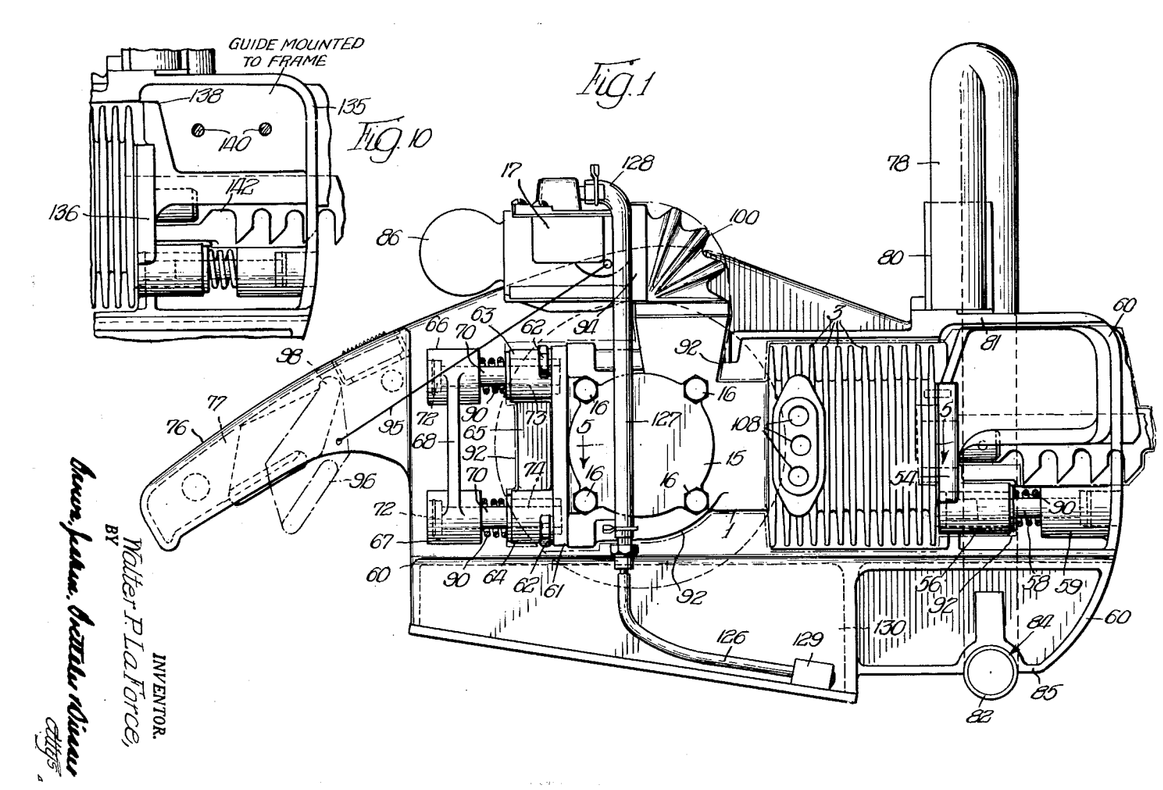
FIGURE 1 is a fragmentary side elevational view showing one form of portable power saw embodying the present invention.
FIGURE 10 is a fragmentary view showing a structure in which the blade guide is fastened to the main frame, so that it is a portion of the fixed rather than the vibrating mass.

The sleeve portion 39 may constitute an integral part of a front housing 54, as shown in FIGURE 1. The front housing 54 has an integral sleeve or collar portion 56 guided longitudinally on a guide pin 58 carried by a boss 59 on the supporting structure comprising a main frame 60.

The crankcase has another closure member 61 fastened thereto by screws or bolts 62. The closure member 61 has upper and lower bosses 63 and 64, with a connecting web 65 therebetween. The main frame 60 has upper and lower bosses 66 and 67 aligned with the bosses 63 and 64, and connected at 68. The bosses 66 and 67 are integral with the main frame 60 or attached thereto. Guide pins 70, headed at their outer ends at 72 (FIGURE 1) and suitably fixed in place, extend through the bosses 66 and 67 on the main frame 60 and into openings 73 and 74 in the bosses 63 and 64 on the closure member 61 for longitudinal sliding movement of the bosses 63 and 64 on the pins 70.

The air inlet to the carburetor 17 is preferably provided with an air filter as illustrated more or less diagrammatically at 86 in FIGURE 1.

Figure 2:
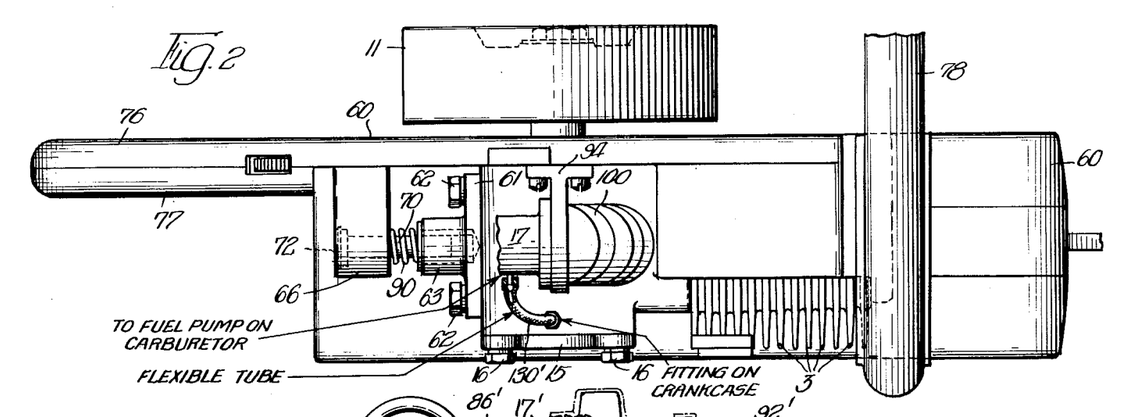
FIGURE 2 is a fragmentary and more or less diagrammatic plan view of the saw illustrated in FIGURE 1.
Figure 3:
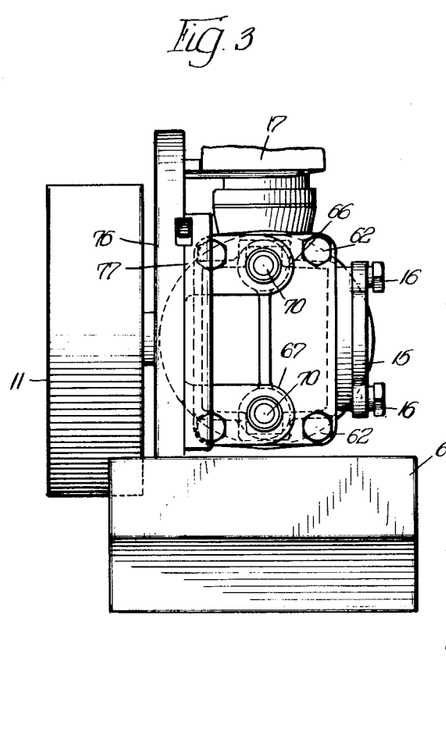
FIGURE 3 is a fragmentary rear end view of the saw illustrated in FIGURE 1.

Integral with the main frame 60, as shown in FIGURES 1 and 2, is a rearwardly extending and downwardly inclined rear handle 76 having a complementary rear handle part 77 suitably secured thereto.

Figure 4:
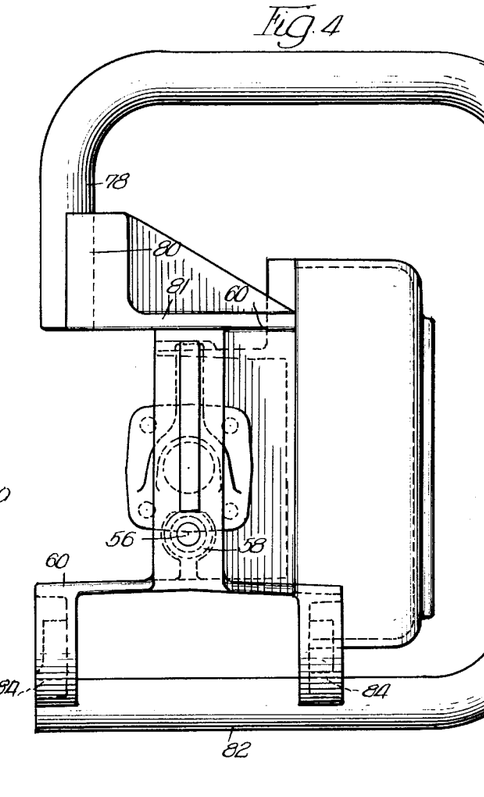
FIGURE 4 is a fragmentary front end view of the saw illustrated in FIGURE 1.

At the front is a sidewardly disposed handle 78 suitably fastened at 80 to the adjacent portion 81 of the main frame 60, as illustrated in FIGURES 1 and 4. The handle 78 is looped sidewise about the front housing 54 with its lower end turned in at 82 and seating in transverse semi-cylindrical depressions 84 in the bottom portions 85 of the main frame 60. Thus, by grasping the rear handle 76 and its complementary part 77 and the front handle 78, the saw may be applied and manipulated as desired. The saw is normally rocked when cutting, but not about any particular axis. The looping of the handle 78 makes it convenient for cutting in any position, including upside down.

Figure 6:
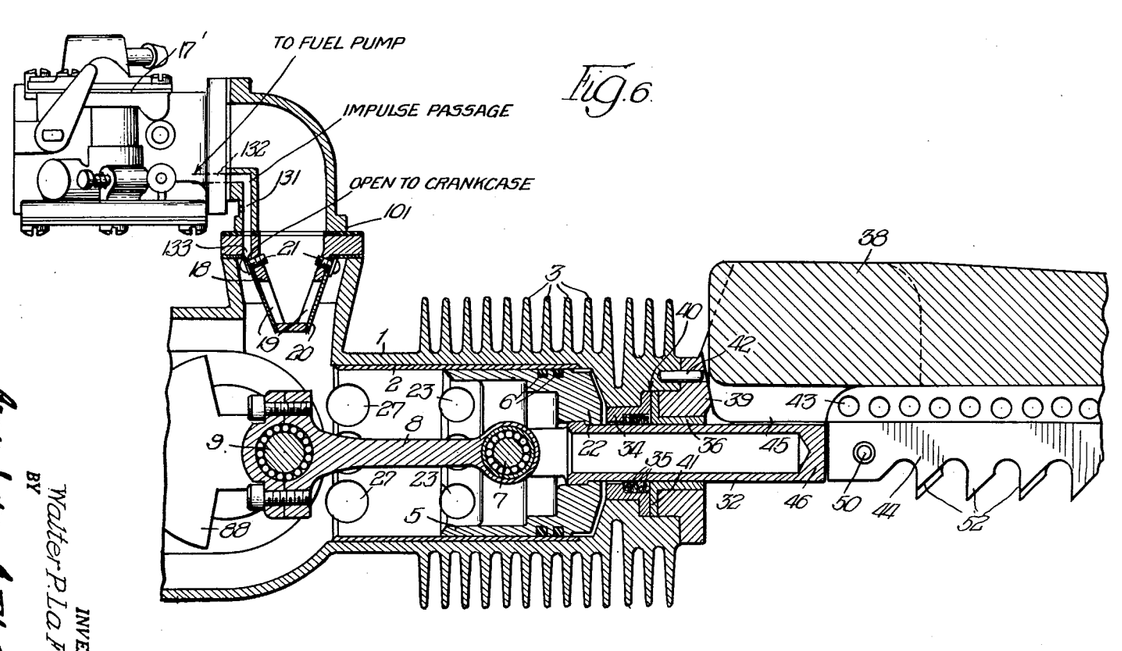
FIGURE 6 is a fragmentary axial sectional view taken along the line 6—6 of FIGURE 5.

Instead of adding sufficient counterweight to the crankshaft 6 to minimize the vibration, the system is calculated so that only the rotary unbalance is eliminated. Crankshaft counterweights 88 are preferably used, as illustrated in FIGURES 5 and 6, but they are smaller than they would be otherwise, and compensate only for the rotary unbalance introduced by the crank throw and the rotary component of the connecting rod.

With the rotary components eliminated, the remaining unbalance is purely reciprocating, and its direction is confined to a plane parallel to the horizontal axis of the engine, parallel to the blade and cylinder bore.

The engine and its components are then isolated from the supporting structure by means of the three guide pins 58 and 70, which allow the engine and its components to move freely relative to the supporting structure and along the unbalanced axis. Properly calibrated springs 90, rubber mounts, or some other resilient material, are disposed about the guide pins 58 and 70 and between the bosses 56 and 59; also between the bosses 66 and 63 and between the bosses 67 and 64 to absorb some of the energy of the vibrating system, and to limit the motion of the engine and its components. When properly designed, some vibration may be felt at the handles, but it is within acceptable limits, and is not sufficient to make the saw uncomfortable to operate.

As previously pointed out, this vibration could not be reduced to an acceptable level by conventional methods of counterweighting the crankshaft where there is no second opposed piston. Thus, the second opposed piston is eliminated, along with the cylinder, connecting rod and crankshaft throw; and a smaller, lighter, more economical and more efficient saw is provided.

The isolated system is outlined by dot and dash lines 92 in FIGURE 1, and it includes as few components as possible, since it is desirable to keep the ratio of moving weight to total weight as small as possible. The entire engine must be a part of the moving weight. Since the saw blade and guide are rigidly attached to it, they also move with the engine. Included in this moving weight are the crankcase, crankshaft, connecting rod, firing cylinder and piston, front housing, saw blade and guide, magneto, flywheel, starter cup and air filter.

The supporting structure comprises the main frame 60 to which are attached the handle 76 with its complementary part 77, handle 78, gas tank, shrouding, and starter.

Clearance should preferably be provided to allow the engine and its components to move about ¼ inch, and the throttle control should be of a character so that this movement does not affect the amount of throttle opening.

In FIGURE 1, the carburetor 17 is attached to a rigid frame or arm 94, integral with or attached to the main frame 60 so that there is no relative motion between the carburetor 17 and the rear handle 76 and its complementary part 77. Thus, a direct throttle connection may be made. One illustrative form of such direct connection is through a throttle wire 95 connected at one end to the carburetor throttle and at its other end to an arm or fingerpiece 96 pivoted to the handle 76 at 98. Thus, with the rear handle grasped in the hand, the fingerpiece 96 may be manipulated to control the throttle through the wire 95.

In order to allow for relative motion between the engine and its components and the carburetor, a flexible bellows 100 is provided between the carburetor and the engine. The fuel mixture passes from the carburetor 17 through the flexible bellows 100 to the body 18 of the reed valve, or check valve, and into the crankcase 12.

Fuel is supplied to the engine by a flexible hose 126 connected to a flexible fuel line 127 which is connected at 128 to the carburetor 17. The flexible hose 126 has a fuel pickup 129 through which the fuel is picked up from the fuel tank 130 and delivered to the carburetor 17 through hose 126 and fuel line 127. A fuel pump is employed. In this case, the pump is part of the standard carburetor assembly, and the pump diaphragm is actuated by crankcase impulses through a connecting flexible tube 130' in the case where a bellows is used, as illustrated in FIGURE 2.

With a solid connection between the carburetor and the crankcase, the impulse connection may be made internally through a series of drilled or cored holes 131 leading to the fuel pump at 132 and opening to the crankcase at 133, as illustrated in FIGURE 6.

With the fuel tank on the bottom as illustrated, the pump is necessary. If the tank were on the top, gravity feed could be used in normal cutting, but the fuel pump would still be necessary to allow cutting in any position.

Figure 7:
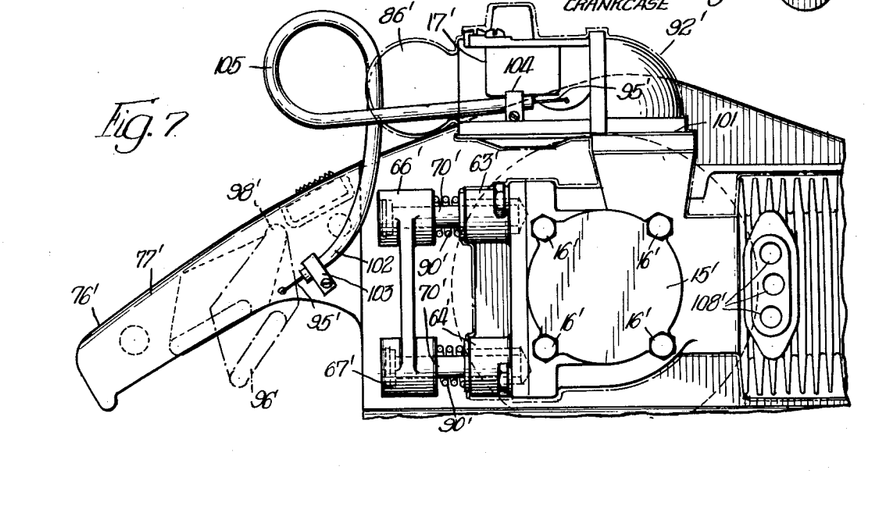
FIGURE 7 is a fragmentary side view of the saw illustrated in FIGURE 1, but showing another form of structure for allowing positive control of the throttle, with relative movement between the rear handle and the carburetor.

In FIGURE 7 the carburetor 17' is rigidly mounted on the engine at 101 for delivery of the fuel mixture into the crankcase as previously described. Thus, the carburetor 17' vibrates with the engine and its components. In this form, the throttle wire 95' passes through a hollow flexible casing 102 which is rigidly attached at one end at 103 to the rear handle 76 and its complementary part 77. The other end of the flexible casing 102 is attached at 104 to the carburetor 17'. A loop 105 in the casing 102 allows positive control of the throttle with relative movement between the carburetor and the handle. The throttle wire 95' is connected at one end to the carburetor throttle and at its other end to an arm or fingerpiece 96' pivoted to the handle at 98' as in FIGURE 1. Other parts in FIGURE 7 corresponding with parts illustrated in FIGURES 1–6 are designated by primed (') reference characters corresponding with those previously used. The isolated system is outlined by dot and dash lines 92' in FIGURE 7.

FIGURE 6 also shows the carburetor 17' rigidly mounted on the engine at 101 as illustrated in FIGURE 7.

In FIGURES 1 and 5, exhaust ports 108 open near the completion of the movement of the piston 5 toward the crankcase, and the burned gases under pressure will be exhausted from the combustion chamber 25 through the ports 108.

It is preferable to locate pin 58 and spring 90, and one of the pins 70 and corresponding spring 90 on the horizontal axis through the center of gravity of the moving weight (engine). This eliminates the shaking movement which is a result of the eccentricity between the guide and spring components and the center of gravity. Where it is impractical to locate the pins exactly on the horizontal axis through the center of gravity, it is preferable to come as close as possible, and accept the relatively small shaking force which results.

In FIGURE 10, the blade guide as shown at 38 in FIGURE 6 is fastened to the main frame 135, which corresponds, in general, to the main frame 60, so that it is a portion of the fixed rather than the vibrating mass. This reduces the ratio of moving to fixed weight, and also reduces the load on the pin 58, since the force when cutting is now absorbed by the main frame through the guide rather than by the pin.

In FIGURE 10, the front housing 54 no longer exists as such. It is replaced by a ring 136, which corresponds, in general, with the sleeve or ring part 39, as illustrated in FIGURE 6. Material is added to the corner of the main frame 135, as indicated at 138 in FIGURE 10. This material is longitudinally slotted to accept the guide, which is held in place by two screws 140. A longer cutout 142 under the blade tang is provided to allow for the additional motion between the blade and guide.

Figure 8:
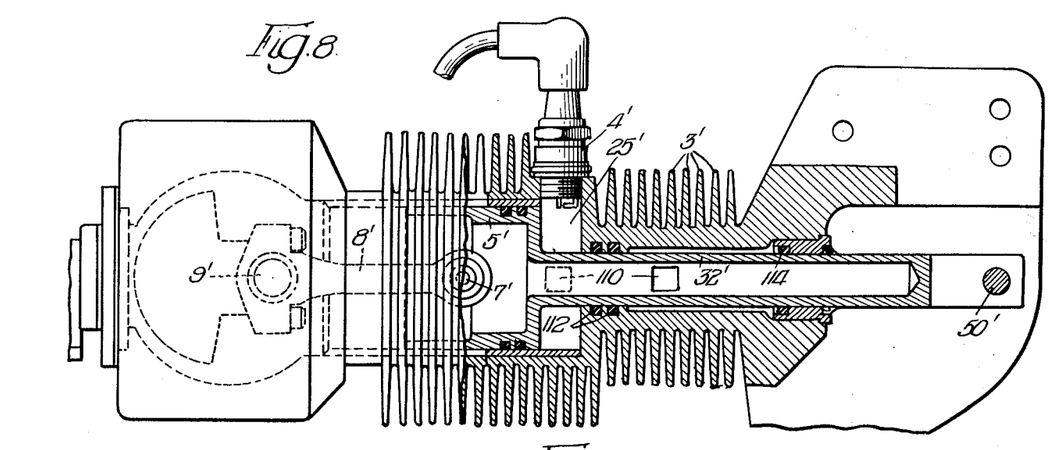
FIGURE 8 is a fragmentary axial sectional view through the cylinder housing and piston, and the saw blade and guide combination, and showing an inlet porting system using port means in the piston extension.

Instead of using an inlet porting system, such as is illustrated in FIGURE 5, one or more fuel inlet ports, one being illustrated at 110 in FIGURE 8, may be suitably formed in the tubular wall of the piston extension 32' so as to open into the combustion chamber 25' to place the interior of the cylinder 1' in communication with the combustion chamber 25' near one end of the reciprocatory movement of the piston, i.e., when the port 110 is in the position shown in dotted lines. The port 110 moves out of communication with the combustion chamber 25' upon movement of the piston in the opposite direction. In FIGURE 8 the piston 5' is shown at the limit of its movement away from the crankcase, i.e., to the right, and the inlet port 110 is then positioned as illustrated in full lines.

Sealing rings 112 cooperate with the piston extension 32' to seal the combustion chamber 25'. One or more additional sealing rings, one being illustrated at 114, may cooperate with the piston extension outwardly of the sealing rings 112. As shown in full lines, the inlet port 110 is disposed between the sealing rings 112 and the sealing means 114 near the end of the reciprocatory movement of the piston, which moves the inlet port 110 out of communication with the combustion chamber 25'.

Figure 9:
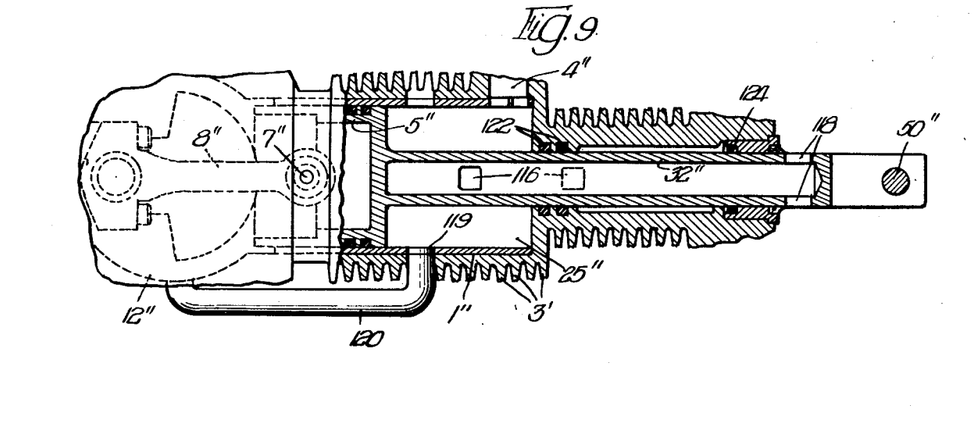
FIGURE 9 is a sectional view similar to FIGURE 8, but showing an exhaust porting system using port means in the piston extension.

Instead of using an exhaust porting system, such as is illustrated in FIGURES 1 and 5, one or more exhaust ports, one being illustrated at 116 in FIGURE 9, may be suitably formed in the tubular wall of the piston extension 32''. As the piston approaches position toward the crankcase, as shown in FIGURE 9, the burned gases are exhausted under pressure from the combustion chamber 25'' into the tubular piston extension 32'' through the exhaust port 116 and from the interior of the tubular piston extension 32'' through outlet ports 118 near the outer end of the piston extension.

Inlet ports 119 are formed in the cylinder 1'' to introduce the fuel mixture into the combustion chamber 25'' from conduits 120 (one shown) connected in this form of the invention to the crankcase 12'' into which the fuel may be delivered as previously described. Sealing rings 122 cooperate with the piston extension 32'' to seal the combustion chamber 25''. Additional sealing rings or seals 124 cooperate with the piston extension 32'' outwardly of the sealing rings 122.

The saw blade and guide combination used with the porting systems of FIGURES 8 and 9 may be of the form previously described. Suffice it to say that screw or bolt 50' shown in FIGURE 8 and screw or bolt 50'' shown in FIGURE 9 correspond with the screw or bolt 50 as shown in FIGURES 5 and 6. The engine and its components, using the porting system of FIGURE 8 or the porting system of FIGURE 9 may be isolated from the supporting structure with which the handle means is associated, as illustrated in FIGURES 1 through 7.

The embodiments of the invention disclosed in the drawings and the specification are for illustrative purposes only, and it is to be expressly understood that said drawings and the specification are not to be construed as a definition of the limits or scope of the invention, reference being had to the appended claims for that purpose.

I claim:

1. A portable power saw comprising a single cylinder portable internal combustion engine having a bore in which a single piston constituting a firing piston is operable, a sealed combustion chamber and a crankshaft, a connecting rod connecting said piston to said crankshaft, a reciprocating power output taken directly from said firing piston by means of a firing piston extension passing through the sealed combustion chamber, a saw blade actuated by said firing piston extension, crankshaft counterweight means mounted on the crankshaft and of such weight as to eliminate only rotary unbalance introduced by the crankshaft throw and rotating movement of the connecting rod and disposed so that the remaining unbalance is reciprocatory in a direction confined to a plane parallel to the axis of the engine and parallel to the saw blade and cylinder bore, guide pins on which the engine is movable in the direction of travel of the firing piston, and shock absorbing springs associated with said guide pins and coacting with the engine to cushion the vibration of the engine in the direction of travel of the firing piston.

2. A portable power saw according to claim 1, wherein there is a main frame and handle means attached to said main frame for manipulating the saw and the cushioning of the vibration of the engine in the direction of travel of the firing piston isolates the vibration from said handle means.

3. A portable power saw according to claim 1, wherein there is a main frame and the guide pins are carried by bosses on said main frame, bosses on the engine guided on said guide pins in the direction of travel of the firing piston, the shock absorbing springs surrounding the guide pins and acting endwise against the bosses on the main frame and the bosses on the engine, and handle means rigid with the main frame for manipulating the saw.

4. A portable power saw according to claim 1, wherein there is a main frame and the guide pins are relatively short and are carried by bosses on said main frame and project toward opposite ends of the engine, bosses on opposite ends of the engine guided on said guide pins in the direction of travel of the firing piston, the shock absorbing springs surrounding the guide pins and acting endwise against the bosses on the main frame and the bosses on the engine, and handle means rigid with the main frame for manipulating the saw and from which vibration of the engine in the direction of travel of the firing piston is isolated by said shock absorbing springs.

5. A portable power saw according to claim 1, wherein there is a main frame and the guide pins are carried by bosses on said main frame, bosses on the engine guided on said guide pins in the direction of travel of the firing piston, the shock absorbing springs surrounding the guide pins and acting endwise against the bosses on the main frame and the bosses on the engine, handle means rigid with the main frame for manipulating the saw, a carburetor for supplying a fuel mixture to the engine attached to said main frame, and a flexible bellows connected between the carburetor and the engine through which the fuel mixture is supplied to the engine.

6. A portable power tool comprising a single cylinder portable internal combustion engine having a single piston constituting a firing piston, a sealed combustion chamber and a crankshaft, a connecting rod connecting said piston to said crankshaft, a reciprocating power output taken directly from said firing piston by means of a firing piston extension passing through the sealed combustion chamber, crankshaft counterweight means mounted on the crankshaft of such weight as to eliminate only rotary unbalance introduced by the crankshaft throw and rotary movement of the connecting rod and disposed so that the remaining unbalance is reciprocating in a direction confined to a plane parallel to a horizontal axis of the engine, guide pins means on which the engine is movable in the direction of travel of the firing piston, and shock absorbing means associated with said guide pins and coacting with the engine to cushion the vibration of the engine in the direction of travel of the firing piston.

7. A portable power tool comprising in combination an internal combustion engine having a single reciprocating piston, a tool actuated by said piston, a main frame extending throughout substantially the length of said engine, first boss means rigid with said main frame and projecting laterally therefrom in position normally spaced from one end of said engine, second boss means rigid with said main frame and projecting laterally therefrom in position normally spaced from the opposite end of said engine, first guide pin means carried by said first boss means and projecting toward one end of said engine, second guide pin means carried by said second boss means and projecting toward the opposite end of said engine, boss means rigid with the opposite ends of said engine and guided longitudinally on said guide pin means, resilient means surrounding said first guide pin means and acting between said first boss means and the boss means at one end of said engine for absorbing vibration of the engine in one direction, resilient means surrounding said second guide pin means and acting between said second boss means and the boss means at the opposite end of said engine for absorbing vibration of the engine in the opposite direction, a rear handle rigid with said main frame and extending rearwardly, a sidewardly disposed front handle attached to said main frame, a carburetor for supplying a fuel mixture to the engine and attached to said main frame, a flexible bellows connected between the carburetor and the engine through which the fuel mixture is supplied to the engine, said flexible bellows permitting reciprocating movement of the engine with respect to the carburetor, a fingerpiece on the rear handle, and a throttle wire connected at one end to said fingerpiece and at its other end to the carburetor throttle.

8. A portable power tool comprising, in combination an internal combustion engine having a single reciprocating piston, a tool actuated by said piston, a main frame extending throughout substantially the length of said engine, first boss means rigid with said main frame and projecting laterally therefrom in position normally spaced from one end of said engine, second boss means rigid with said main frame and projecting laterally therefrom in position normally spaced from the opposite end of said engine, first guide pin means carried by said first boss means and projecting toward one end of said engine, second guide pin means carried by said second boss means and projecting toward the opposite end of said engine, boss means rigid with the opposite ends of said engine and guided longitudinally on said guide pin means, resilient means surrounding said first guide pin means and acting between said first boss means and the boss means at one end of said engine for absorbing vibration of the engine in one direction, resilient means surrounding said second guide pin means and acting between said second boss means and the boss means at the opposite end of said engine for absorbing vibration of the engine in the opposite direction, a rear handle rigid with said main frame and extending rearwardly, a sidewardly disposed front handle attached to said main frame, a carburetor for supplying a fuel mixture to the engine and attached to said main frame, a flexible bellows connected between the carburetor and the engine through which the fuel mixture is supplied to the engine, said flexible bellows permitting reciprocating movement of the engine with respect to the carburetor, a fingerpiece on the rear handle, a throttle wire connected at one end to said fingerpiece and at its other end to the carburetor throttle, and a flexible fuel line connected to the carburetor and having a fuel pickup through which fuel is picked up from a fuel tank carried by the main frame.

9. A portable power tool comprising, in combination, an internal combustion engine having a single reciprocating piston, a tool actuated by said piston, a main frame extending throughout substantially the length of said engine, first boss means rigid with said main frame and projecting laterally therefrom in position normally spaced from one end of said engine, second boss means rigid with said main frame and projecting laterally therefrom in position normally spaced from the opposite end of said engine, first guide pin means carried by said first boss means and projecting toward one end of said engine, second guide pin means carried by said second boss means and projecting toward the opposite end of said engine, boss means rigid with the opposite ends of said engine and guided longitudinally on said guide pin means, resilient means surrounding said first guide pin means and acting between said first boss means and the boss means at one end of said engine for absorbing vibration of the engine in one direction, resilient means surrounding said second guide pin means and acting between said second boss means and the boss means at the opposite end of said engine for absorbing vibration of the engine in the opposite direction, a rear handle rigid with said main frame and extending rearwardly, a sidewardly disposed front handle attached to said main frame, a carburetor for supplying a fuel mixture to the engine and attached to the engine, a hollow looped flexible casing attached at one end to the rear handle and attached at its other end to the carburetor, and a throttle wire extending through said hollow looped casing and connected at one end to the carburetor throttle and at its opposite end to a fingerpiece on the rear handle.

References Cited in the file of this patent

UNITED STATES PATENTS

| | | |
|---|---|---|
| 1,177,682 | Clark | Apr. 4, 1916 |
| 1,535,433 | Morrell | Apr. 28, 1925 |
| 1,580,720 | Gold | Apr. 13, 1926 |
| 1,667,280 | Blanding | Apr. 24, 1928 |
| 1,888,333 | Terry | Nov. 22, 1932 |
| 1,931,535 | Gartin | Oct. 24, 1933 |
| 2,461,199 | Convert | Feb. 8, 1949 |
| 2,610,657 | Kiekhaefer | Sept. 16, 1952 |
| 2,895,514 | Wright | July 21, 1959 |
| 2,942,589 | Wacker | June 28, 1960 |

FOREIGN PATENTS

| | | |
|---|---|---|
| 283,224 | Great Britain | Jan. 10, 1929 |